INVENTOR.
RICHARD H. SPARKS
HOWARD L. LAYTE

Feb. 3, 1970  R. H. SPARKS ET AL  3,493,837
BATTERY CHARGE CONTROL SYSTEM
Filed Oct. 3, 1966  3 Sheets-Sheet 3

INVENTORS
RICHARD H. SPARKS
HOWARD L. LAYTE
BY Arthur Frelich
ATTORNEYS

United States Patent Office 3,493,837
Patented Feb. 3, 1970

3,493,837
BATTERY CHARGE CONTROL SYSTEM
Richard H. Sparks, Westminster, and Howard L. Layte, Inglewood, Calif., assignors to TRW Inc., Redondo Beach, Calif., a corporation of Ohio
Filed Oct. 3, 1966, Ser. No. 583,644
Int. Cl. H02j 7/32
U.S. Cl. 320—29    14 Claims

ABSTRACT OF THE DISCLOSURE

The application discloses an example of an automatic charge rate control system for recharging a set of electric storage cells from a matrix of solar cells. A charging switch is provided for connecting the storage battery to the solar cells, each of which is connected to a voltage sensing device for providing a signal indicative of an overcharge condition. In addition, the system disclosed includes a logic network coupled to the voltage sensing devices for opening the charging switch upon achieving a predetermined over-voltage condition of the battery cells. For further details of the disclosed electric control circuitry, reference is made to the complete specification.

---

This invention relates generally to a battery charge control system and more particularly to such a system suitable for use in unattended environments, such as in spacecraft applications.

In spacecraft and other environments, a primary power source, such as a solar cell array, is primarily used to provide power to a load while a secondary source, such as a rechargeable battery, is used during periods of solar eclipse, for example. While the solar cell array is in sunlight, the battery is recharged therefrom. In most such applications, the batteries must be recharged often and in the least possible time with maximum charge efficiency. Accordingly, it is necessary to provide a charge control system to assure rapid efficient charging while preventing overcharging. It is also usually important that the charge control system be of minimum weight and volume and yet be of extremely high reliability.

Techniques for charging batteries which can be successfully employed in attended environments on the surface of the earth, are generally not suitable for unattended space applications. Usually much longer recharging periods are available on the earth's surface than are available in a near earth orbiting spacecraft. In the latter case, the solar cell array may be in sunlight for only sixty minutes of a ninety minute orbit and it is usually desired to charge the battery as fully as possible during each orbit. When the high charge rates necessary to accomplish this are em-employed, special precautions are required to prevent overcharging which usually results in gas formation in the battery cells. Gas formation tends to damage the plates and produce excessive heat in most cells. If the cells are unsealed, an additional harmful effect of overcharge is that water is lost from the electrolyte. In hermetically sealed cells, such as are required to operate in a vacuum of space, gas formation produces internal pressure which can perforate the hermetic seal, or, if allowed to accumulate, can burst the cell case.

In view of the foregoing, it is an object of the present invention to provide a charge control system which permits a battery to be efficiently charged to full capacity at a high rate without excessively overcharging any individual cells.

Many known prior art systems employ a charge control device in series with the battery to modulate the charge current in response to the battery voltage. Other known systems provide a high charge current which is controlled by shunting the current around individual cells as each becomes fully charged. In the former case, the danger of overcharging individual cells arises. In the latter situation, unduly heavy and cumbersome shunt devices are required to dissipate the shunted power. Moreover, the dissipated power usually shows up as heat which often cannot be easily tolerated.

The present invention is based upon the concept of providing a charge control system primarily responsive to the voltage of the weakest battery cell rather than an average of all of the cells. The concept is based upon the recognition that the weakest cell ultimately determines the battery capacity and when not protected, will destroy the battery.

In accordance with a preferred embodiment of the invention, a plurality of voltage sensors are provided, each connected to monitor the voltage of a different battery cell. The cells are of course all connected in series across a primary source, such as a solar cell array. A load is also connected substantially in parallel with the battery across the primary power source. A first maximum voltage level is established at each cell dependent upon both temperature and charge current. When the voltage across any cell exceeds the first maximum voltage level established therefor, the sensor associated therewith provides a signal to a logic network indicating the cell overvoltage condition. The logic network can be set to switch into a control mode in response to any desired number of cells being in an overvoltage condition. When the logic network is initially switched into a control mode, as after an eclipse, it opens a pair of contacts through which a high charge current was supplied from the primary source. If thereafter the voltage on any one of the overcharged cells then drops below a second voltage level, the logic network falls out of the control mode and the cells are then thereafter reconnected to the charge source through a semiconductor control device such as a transistor. In response to a subsequent overvoltage condition on a sufficient number of cells to again switch the logic network into the control mode, the charge current will be controlled by way of the transistor. The effect of this method of operation is a variable pulse width charge modulation which is controlled by the charge demand of the weakest cell. Further, this method enables a peaking of cell capacity (ampere-hours) in the remaining cells as a consequence of more efficient conversion of the modulated energy pulses in those cells which are not overcharged. When the primary power source, e.g. the solar cell array, goes into eclipse, the previously referred to contacts are then closed to permit the battery to drive the load through as low an impedance path as possible and to subsequently permit the battery to be charged as rapidly as possible once the solar cell array emerges from the contacts will be opened and subsequent charging will again be through the transistor.

The novel features that are considered characteristic of this invention are set forth with particularity in the appended claims. The invention will best be understood from the following description when read in connection with the accompanying drawings, in which:

Figure 4:
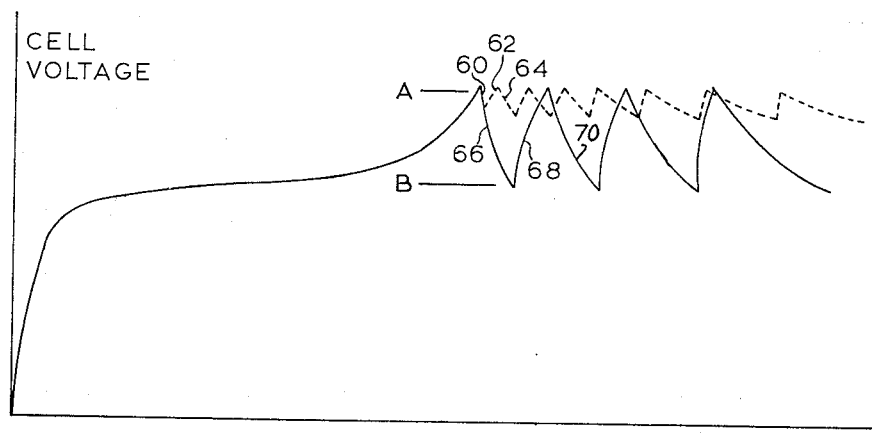
Figure 5:
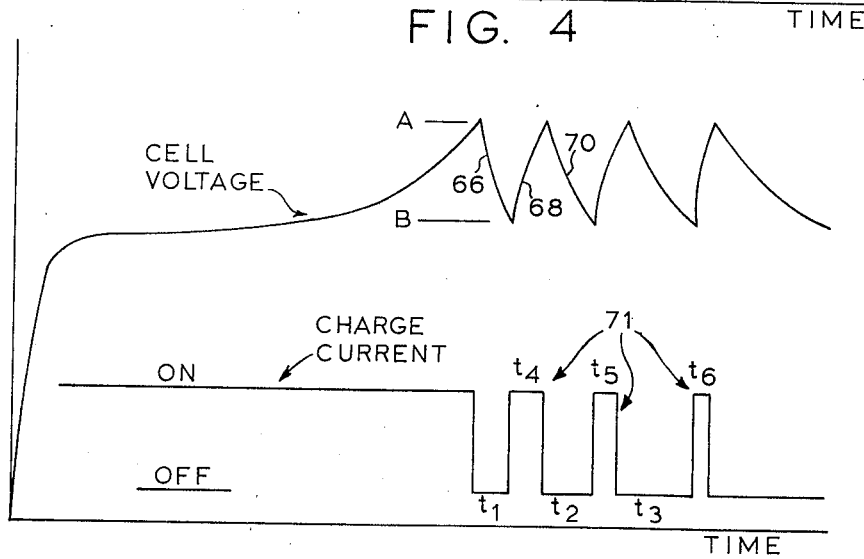

FIGURE 4 is a chart illustrating the manner in which the charge current is controlled to avoid shortening cell life by excessive overcharging and FIGURE 5 is a chart depicting charging current versus time which illustrates the tendency for all of the cells to ultimately become fully charged as a consequence of the cell characteristic that the least charged cell has the highest enegry conversion efficiency.

Figure 1:
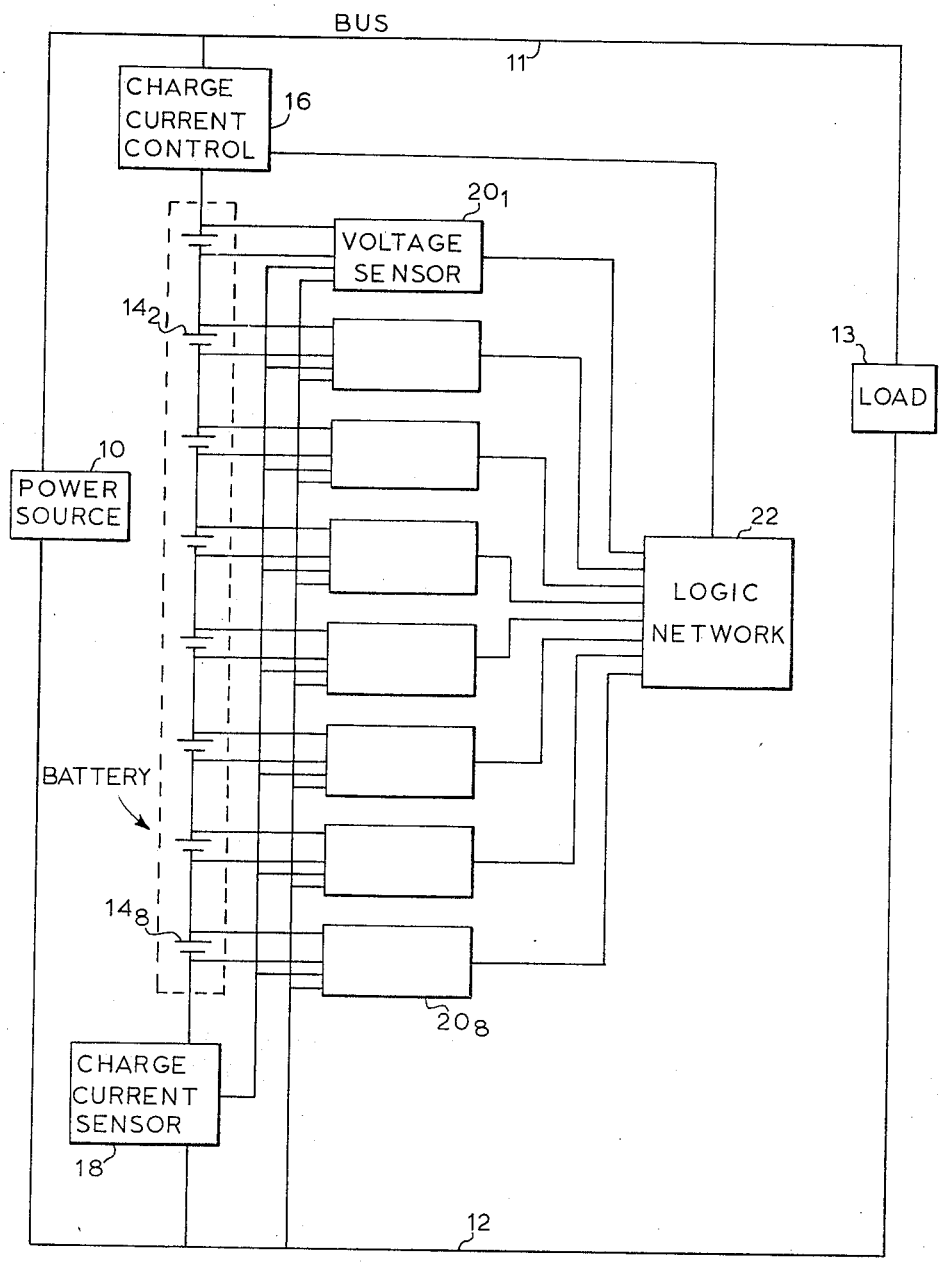
FIGURE 1 is a block diagram generally illustrating a system in accordance with the present invention.

Attention is now called to FIGURE 1 which illustrates a system in which the charge control apparatus of the present invention can be advantageously employed. The system of FIGURE 1 includes a primary power source 10, e.g. a solar cell array, which is connected between a bus 11 and a system ground 12. A load 13 is also connected between the bus 11 and system ground 12. The system of FIGURE 1 is adapted to be utilized in an orbiting spacecraft environment in which the solar cell array is exposed to sunlight for perhaps only about 60% of the time. The load 13 of course must be supplied with energy continually and accordingly a secondary power source comprising a battery formed of a plurality of cells 14 is also provided. Although the primary application of the system of FIGURE 1 is in spacecraft environments, it should be appreciated that the discussion herein will be applicable to any system in which energy must be continually provided to a load and in which the primary source 10 is only intermittently operable.

The battery is illustrated as being comprised of eight cells ($14_1$–$14_8$) connected in series. It should of course be appreciated that in fact the battery can contain any number of cells. Although the invention primarily contemplates the utilization of nickel cadmium, silver cadmium, or silver zinc cells, the teachings of the invention are applicable to the utilization of virtually any type of rechargeable cell.

In accordance with the present invention, the positive terminal of the first battery cell $14_1$ is connected through a charge current control means 16 to the bus 11. The negative terminal of the last battery cell $14_8$ is connected to the system ground 12. A charge current sensor 18 of conventional construction is coupled to the battery to sense the magnitude of the charge current through the serially connected cells. In a presently preferred and practical example of the invention, the sensor 18 is a saturable core reactor embodying an oscillator, the output of which is coupled across a transformer to a rectifier whose dc output, in turn, is proportional to the charging current magnitude by virtue of the latter passing through a control winding of the saturable core transformer.

A voltage sensor device 20 ($20_1$–$20_8$) is connected across each of the cells 14. Each voltage sensor 20 functions to measure the voltage across a cell and compare it with a predetermined level. In the event the cell voltage exceeds the predetermined level, the voltage sensor will provide an overvoltage output signal on its output terminal. The output terminals of all of the voltage sensors 20 are connected to the input of a logic network 22 whose output controls the charge current control means 16. The logic network 22 can be made to respond to any desired number of overvoltage signals. Thus, the logic network 22 can be set to inhibit the charge current in response to one voltage sensor indicating a cell overvoltage condition or on the other hand can be set to respond only when at least half the voltage sensors indicate cell overvoltage conditions. Arbitrarily, it will be assumed hereinafter, that the logic network 22 is set to exercise control over the charge control means 16 in response to two voltage sensors 20 indicating cell overvoltage conditions.

Prior to considering the details of a preferred embodiment of the invention, the overall operation of the system of FIGURE 1 will be briefly described. Assume that the spacecraft carrying the system of FIGURE 1 just emerges from an eclipse and all of the cells are in an undercharged condition. A low impedance switch will be closed in the charge current control means 16 so that the primary power source 10 can rapidly and efficiently charge the battery cells 14 in addition to supplying energy to the load 13. The voltage sensors 20 will monitor the cell voltages and as soon as an overvoltage condition develops in two or more of the cells, the logic network 22 will respond to cut off the charging current and in addition to open the low impedance switch means and enable a second switch means comprising a semiconductor such as a transistor. Thereafter, if at any time less than two of the cells are in an overvoltage condition, reflecting cell demand for more storable energy, the logic network 22 will permit charge current flow through the second transistor switch means. Once the spacecraft goes into eclipse again as evidenced by the potential on the bus 11 being lower than the potential on the positive terminal of the cell $14_1$, the second transistor switch means will be opened and the first low impedance switch means will be closed to thereby permit the battery to drive the load 13 through as low an impedance path as possible. In addition, by closing the low impedance switch means, as soon as the spacecraft thereafter emerges from the eclipse, the primary power source 10 can most efficiently and rapidly recharge the battery cells 14.

As will be seen hereinafter, the sensor 18 which monitors the series charge current through the cells 14 is coupled to the voltage sensors 20 in order to effect the magnitude of cell voltage which indicates an overvoltage condition. That is, with a higher magnitude charge current, a higher measured cell end voltage can be tolerated because of the greater voltage drops across connecting leads for example. This is explained in greater detail in connection with FIGURE 3. Also, as will be explained in connection with FIGURE 3, the voltage sensors 20 are temperature compensated because the end voltage to which each cell can be charged decreases as the temperature thereof increases.

Figure 2:
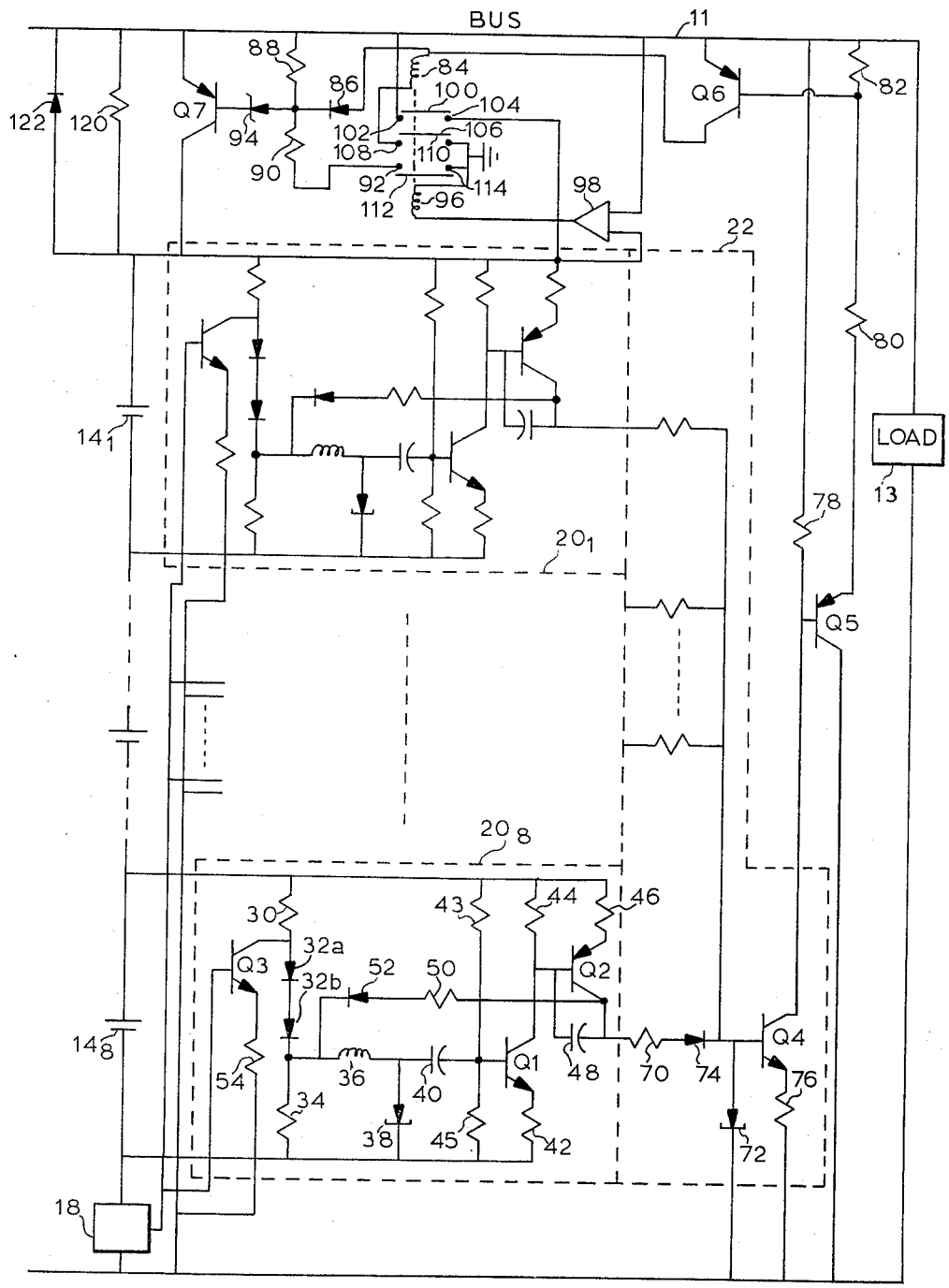
FIGURE 2 is a schematic diagram illustrating the circuit details of a preferred embodiment of the invention.

Attention is now called to FIGURE 2 which illustrates the circuit details of a preferred embodiment of the inventon. As previously noted, the input terminals of each voltage sensor 20 are connected across the terminals of a battery cell 14. Each voltage sensor 20 includes a voltage divider branch comprised of a resistor 30, one or more temperature sensitive devices 32, e.g. silicon diodes, and a resistor 34 all connected in series. The preferred embodiment of the invention illustrated in FIGURE 2 is designed primarily to operate with silver cadmium battery cells whose temperature characteristic calls for the utilization of two serially connected silicon diodes 32$a$ and 32$b$ (a single diode suffices for a nickel cadmium battery).

The first end of an inductor 36 is connected to the junction between the diode 32$b$ and the resistor 34. The second end of the inductor 36 is connected to the anode of a tunnel diode 38 whose cathode is connected to the negative side of the cell 14. A capacitor 40 connects the anode of the tunnel diode 38 to the base of an NPN transistor Q1. The emitter of the transistor Q1 is connected to a resistor 42 to the negative side of the battery cell.

The collector of the transistor is connected through a resistor 44 to the positive side of the battery cell. Bias resistors 43, 45 connect the base of transistor Q1 to the respective voltage sensor input terminals. The collector of transistor Q1 is also connected to the base of a PNP transistor Q2 whose emitter is connected through resistor 46 to the positive side of the battery cell. The collector of transistor Q2 is connected through capacitor 48 to the base thereof. In addition, the collector of transistor Q2 is connected through a feedback path comprised of resistor 50 and diode 52 to the first end of the inductor 36.

In addition to the foregoing, the junction between the resistor 30 and diode 32$a$ is connected to the collector of an NPN transistor Q3. The base of transistor Q3 is connected to the output terminal of the previously mentioned charge current sensor 18 which provides an output voltage substantially proportional to the magnitude of charge current through the battery cell. The emitter of transistor Q3 is connected through a resistor 54 to the negative terminal of the battery.

In considering the operation of a voltage sensor 20, initially consider that the cell 14 being monitored is in an undervoltage condition. The tunnel diode 38, which is biased for monostable operation, will therefore define a high current, low voltage, stable state. As a consequence, a low DC voltage level will be applied to the base of transistor Q1 which will consequently be held off. The collector of transistor Q1 will therefore be at a high potential holding transistor Q2 off.

Now assume that the voltage across a cell 14 increases, thereby increasing the potential across the voltage divider branch and the potential at the junction between the diode 32b and resistor 34. As is well known, tunnel diodes biased for monostable operation with a stable high current, low voltage state can be driven into an astable condition by increasing the current through the tunnel diode past the initial peak ($I_p$-peak current) in its characteristic S curve. It can be seen, therefore, that as the voltage across the divider branch increases, increasing the voltage at the junction between the diode 32b and resistor 34, the current through the tunnel diode 38 will increase to drive it out of its stable state. The inductor 36 is provided to maintain the high current level through the tunnel diode 38 to thereby momentarily move it to a high voltage, high current point on its characteristic curve. This is desirable in order to more reliably provide a high potential to the base of transistor Q1 sufficient to drive it on. As the stored current from the inductor dissipates, the operating point of the tunnel diode will return to its stable state. However, if the voltage across the divider branch is still great enough to drive a current through the tunnel diode sufficient to move it past its initial peak, the tunnel diode 38 will again switch to an astable condition. Thus the tunnel diode 38 will continue to oscillate ofr so long as the potential available across the cell 14 is sufficient to provide a current to drive the tunnel diode out of the stable state.

As the tunnel diode 38 oscillates, it will provide periodic positive pulses to the base of transistor Q1. Consequently, negative pulses will appear at the collector of transistor Q1 which will forward bias the transistor Q2. Consequently, a positive signal will appear at the collector of transistor Q2 which will build up across the capacitor 48. The capacitor 48 serves to slow the output response of transistor Q2 or in other words, to slowly build up a positive potential threat. An important circuit feature here is that the circuit's susceptability to noise is extremely low; i.e. in the vent of a positive transient across the cell, the tunnel diode would oscillate several times dependent on transient pulse width, but the circuit would not produce an output nor would it latch up until the cell's voltage remained at a high steady state DC potential. Capacitor 48 is the component that introduces this delay time into the feedback circuit. The positive potential built up at the collector of transistor Q2 is fed back through the resistor 50 and diode 52 to the inductor 36 for the purpose of latching the voltage sensor 20 in an overvoltage state. That is, the feedback path through the resistor 50 and diode 52 provides current to the tunnel diode 38, tending to maintain it in its oscillating condition thus requiring that the potential across the cell 14 whch permits the voltage sensor 20 to switch out of its overvoltage state, be lower than that required to initially switch the voltage sensor into the overvoltage state. The reason for providing the feedback means for latching the voltage sensor is demonstrated by FIGURE 4 wherein a charging curve plotting cell voltage versus time is illustrated. The dotted portion of the curve illustrates what would occur in the absence of the latching action introduced by the feedback circuit branch while the solid portion of the curve illustrates the operation in the presence of the latching action. More particularly, in the absence of the latching action, the voltage across cell 14 would build up above a first predetermined level A. As will be seen hereinafter, a response to such an overvoltage condition, the charging current will be terminated so that the voltage across the cell then decreases along a path 60. In the absence of latching action, as soon as the voltage across the cell decreases to the level A, charging would again occur along a path 62 and then discharging would occur along a path 64. It should be apparent that therefore in the absence of latching action, the cells would continue to be charged at a high modulation rate as represented by the dotted portion of the curve in FIGURE 4. It has been found that charging and recharging cells at a high modulation rate tends to increase the effective overcharge rate and decrease their expected life. Accordingly, rather than charge and recharge the cells along the dotted portion of the curve of FIGURE 4, the cells are charged and recharged along the solid line portion of FIGURE 4. More particularly, by employing the latching action introduced by the feedback path comprised of resistor 50 and diode 52, the cell voltage will decay along the path 66 until it reaches a lower level B. Thereafter, the cell will begin to charge along the path 68 until it exceeds the level A. In response thereto, the cell voltage will thereafter begin to decay along the path 70 which decay will not be terminated until it reaches the level B. Thus, in effect the latching action introduced by diode 52 and resistor 50 introduces a "dead" zone, so to speak, between levels A and B of FIGURE 4 which reduces the frequency of charge and decay of the battery cells but increases the magnitude thereof. By so doing, the expected life of the battery cells is extended considerably.

It can be noted in FIGURE 4 that the decay time increases and the charge time decreases during successive charging cycles demonstrating that the cells which are not overcharged continue to charge toward full charge capacity. This tendency for the cells to charge toward full capacity results from the phenomena that the lower charged cells have a greater conversion efficiency for a given charge current. This is better depicted by FIGURE 5 which more clearly illustrates the variation or modulation of the width of charge pulses 71. This type of charging directly meets the demand of the weakest battery cell or cells for storable energy. As the cell becomes more fully charged, the decay time to level B increases, $t_1 < t_2 < t_3$ and the recharge pulse width decreases, $t_4 > t_5 > t_6$. The ability of the most fully charged cell to store the energy in the pulses 71 decreases with increasing state of charge. However, the efficiency of the less charged cells is higher than the most fully charged cell, resulting in a capacity balancing trend for all cells, thus tending to ultimately fully charge the entire series string of cells.

Figure 3:
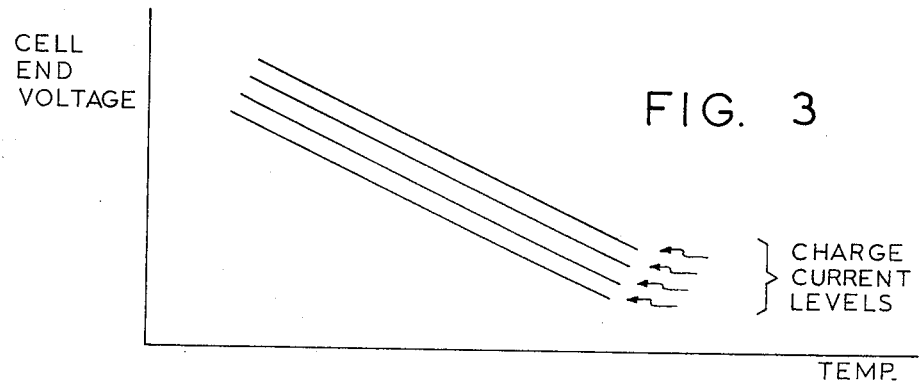
FIGURE 3 is a chart illustrating that the end voltage to which a cell can be charged is dependent upon both temperature and charge current levels.

Attention is now called to FIGURE 3 which illustrates a plot of safe cell end voltage versus temperature for different charge current levels. More particularly, it has been recognized that the voltage to which a cell can be charged depends upon the temperature of the cell and that this end voltage decreases as the temperature increases. In addition, because the potential drop through various leads for example associated with the cell increases as the charge current level increases, the voltage to which a cell can safely be charged increases as the charge current level increases. Thus, the uppermost line in FIGURE 3 represents a high charge current level and the lowermost line represents a low charge current level.

In order to introduce temperature compensation into the voltage sensor 20, temperature sensitive elements, such as silicon diodes 32, are employed. The diodes 32 are packaged so as to be physically close to and have the same temperature as the cells 14. As the temperature increases, the forward voltage drop of the silicon diode 32 decreases, thereby meaning that the tunnel diode 38 can be triggered out of its monostable state in response to a lower voltage across the cell terminals. This of course is the desired action as depicted by the characteristic curves of FIGURE 3. Current compensation is introduced by the transistor Q3 which functions to divert current out of the divider branch and away from the tunnel diode 38 as the charging current increases. Thus, as the charging current increases, the potential applied to the base of transistor Q3 increases thereby drawing more current out of resistor 30. This means that as the charging current increases, a greater potential across the cell is required to switch the tunnel diode out of its monostable state, and therefore cause an overvoltage output signal to be provided at the collector of transistor Q2.

All of the voltage sensors 20 of course operate identically. Thus, each voltage sensor 20 monitors a different cell 14 and provides an overvoltage output signal in the form of a positive DC potential on the collector of the transistor Q2 thereof. The collector of each transistor Q2 is connected through a different summing resistor 70 to the anode of a tunnel diode 72 biased for bistable operation. The cathode of the tunnel diode 72 is connected to the negative terminal of the battery. As previously indicated, it has been assumed that the logic network 22 has been designed to exercise control over the charge current in response to two voltage sensors providing overvoltage signals. The number of overvoltage signals required for the logic network 22 to respond is determined by the magnitude of the resistor 70. Thus, the logic network 22 will respond to the overvoltage signals when they provide sufficient current to switch the tunnel diode 72 from a high current low voltage stable state to a low current high voltage stable state. The tunnel diode 72 will of course switch from the low voltage to the high voltage state in response to sufficient current being driven therethrough to carry it over its peak current in its characteristic S curve. A diode 74 may be required in series with the resistor 70 coupled to the output of voltage sensor $20_8$ in order to prevent reverse current flow into the tunnel diode 38 of the voltage sensor 20 when tunnel diode 72 is in the high voltage state. This reverse current should not occur in the other voltage sensors since the potential at the collectors thereof should normally be above that of the anode of tunnel diode 72.

The anode of the tunnel diode 72 is connected to the base of an NPN transistor Q4 whose emitter is connected through resistor 76 to the system ground 12. The collector of transistor Q4 is connected through resistor 78 to the bus 11. Accordingly, when the tunnel diode 72 is switched into its high voltage stable state by the provision of two or more overvoltage output signals from the voltage sensor 20, the NPN transistor Q4 will be turned on thereby lowering the potential of the collector thereof.

The collector of transistor Q4 is connected to the base of PNP transistor Q5 whose collector is connected to the system ground. The emitter of transistor Q5 is connected through serially connected resistors 80 and 82 to the bus. The junction between resistors 80 and 82 is connected to the base of PNP transistor Q6 whose emitter is connected to the bus. The collector of transistor Q6 is connected to a first relay coil 84 and to the anode of a diode 86. The cathode of the diode 86 is connected to a junction between resistors 88 and 90. The upper terminal of resistor 88 is connected to the bus while the lower terminal of resistor 90 is connected to a switch contact 92, to be discussed. The junction between resistors 88 and 90 is also connected through Zener diode 94 to the base of a PNP transistor Q7 whose emitter is connected to the bus and whose collector is connected to the positive battery terminal. The Zener diode 94 insures that the voltage across the collector and emitter of a saturated transistor Q6 is insufficient to turn on transistor Q7.

In addition to the first relay coil 84, a second relay coil 96 is provided and connected between the system ground 12 and the output of a amplifier 98 whose input is the voltage difference, bus to positive side of the battery. When the bus potential falls below the potential of the positive battery terminal, it senses and amplifies the reversed polarity and provides a signal to energize the relay coil 96.

The relay coils 84 and 96 respectively operate to pull a ganged set of bridging bars up and down as shown in FIGURE 2. More particularly, a bridging bar 100 is provided, adapted to bridge contacts 102 and 104 respectively connected to the bus and the positive battery terminal. In addition, a bridging bar 106 is provided adapted to bridge contacts 108 and 110. Contact 108 is connected to the second end of the relay coil 84 while contact 110 is connected to the system ground. Bridging bar 112 is adapted to bridge contacts 92 and 114. As previously pointed out, contact 92 is connected to resistor 90. Contact 114 is connected to the system ground. When the relay coil 84 is energized, the bridging bars are all pulled upwardly to disengage bridging bars 100 and 106 and engage bridging bar 112 to interconnect contacts 92 and 114. On the other hand, when relay coil 96 is energized, the ganged bridging bars are pulled down to disengage bridging bar 112 and engage bridging bars 100 and 106. Thus, bridging bar 100 interconnects contacts 102 and 104 and bridging bar 106 interconnects contacts 108 and 110.

In order to understand the operation of the charge current control means 16, initially consider that the relay coil 96 was last energized so that bridging bars 100 and 106 are engaged and bridging bar 112 is disengaged. This configuration permits the primary power source 10 to charge the cells 14 directly across the bridging bar 100 which of course is a very low impedance path. Consquently, the charging occurs very efficiently and at a very high rate. Now assume that an overvoltage condition develops on at least two of the cells, thereby forward biasing transistor Q4. As a consequence, transistors Q5 and Q6 will both be turn on. In response to transistor Q6 turning on, relay coil 84 will be energized to disengage bridging bar 100 from contacts 102 and 104 to thus interrupt the charging current. In addition, bridging bar 106 will be moved out of contact with contacts 108 and 110 to thereby deenergize relay coil 84, despite transistor Q6 being held on. In addition, bridging bar 112 will move into contact with contacts 92 and 114 to thereby enable base current to the transistor Q7 when Q6 is off. Conduction through transistor Q7 will be subsequently controlled by the output of transistor Q6. Thus, if it subsequently develops that less than two of the cells are in an overcharged condition, the tunnel diode 72 will revert to a high current low voltage state, turning transistors Q4, Q5 and Q6 off. In response to transistor Q6 turning off, base current flows into the base of Q7 turning on Q7 and charge current is permitted to flow from the primary power source 10 through the transistor Q7 to the battery cell 14.

If the primary power source 10 subsequently becomes inoperative, as for example when the solar cell array goes into eclipse, the potential on the bus will fall below the potential of the positive terminal of the battery. This condition will be recognized by the reverse polarity sensing amplifier 98 which will in turn energize the relay coil 96 to move the bridging bars 100, 106 and 112 to their lower position. As a consequence, the transistor Q7 will be deprived of its base current. However, the positive battery terminal will be shorted to the bus through the bridging bar 100, thereby permitting the battery to most efficiently drive the load 13. In addition, it permits the most rapid and efficient charging of the battery possible, once the solar cell array comes out of the eclipse.

In addition to the foregoing, a trickle charge path is provided between the bus and the positive battery terminal through a high value resistor 120. In addition, an isolation diode 122 is provided between the bus and the positive battery terminal for the purpose of supplying transient loads and isolating the bus from the battery during a battery failed condition.

From the foregoing, it should be appreciated that a battery charge control system has been disclosed herein, which functions to permit the cells of a battery to be efficiently charged at a high rate from a primary power source such as a solar cell array without overstressing individual cells in the series string. Moreover, the charge control system enables energy to be continually and efficiently supplied to a load even when the primary power source is inoperative, as for example when the solar cell array is in eclipse. Although a system in accordance with the invention is exceedingly useful for avoiding cell damage as a consequence of an overvoltage condition, it is pointed out that even adidtional cell protection can be achieved by monitoring the pressure and temperature of each cell in order to terminate charging when these quantities exceed safe limits.

What is claimed is:

1. In combination with a primary power source and a multiple cell battery, a charge control system comprising:
   first switch means connecting said battery across said primary source;
   a plurality of voltage sensing means each coupled to a different one of said cells and responsive to the voltage thereacross exceeding a predetermined level for providing an overvoltage output signal; and
   a logic means responsive to a predetermined number of overvoltage output signals for opening said switch means, each of said voltage sensing means includes means responsive to the charging current through said battery for adjusting said predetermined level.

2. In combination with a primary power source and a multiple cell battery, a charge control system comprising:
   a first low impedance switch means connecting said battery across said primary source;
   a second semiconductor switch means connecting said battery across said primary source;
   a plurality of voltage sensing means each coupled to a different one of said cells and responsive to the voltage thereacross exceeding a predetermined level for providing an overvoltage output signal;
   a logic means responsive to a predetermined number of overvoltage output signals for providing a control signal;
   first means responsive to said control signal and said first switch means being closed for opening said first switch means;
   second means responsive to said first switch means being open for enabling said second switch means;
   third means responsive to said control signal and said second switch means being enabled for inhibiting conduction through said second switch means.

3. The combination of claim 2 wherein said first low impedance switch means includes first and second electrical relay contacts.

4. The combination of claim 2 wherein said semiconductor switch means comprises a transistor.

5. The combination of claim 2 wherein each of said voltage sensing means includes a temperature sensitive means for adjusting said predetermined level in responsive to the temperature of said cells.

6. The combination of claim 2 wherein each of said voltage sensing means includes means responsive to the charging current through said battery for adjusting said predetermined level.

7. The combination of claim 2 wherein each of said voltage sensing means includes means responsive to the provision of an overvoltage output signal for reducing the level of cell voltage required to maintain said overvoltage output signal.

8. The combination of claim 2 including means responsive to the voltage across said battery exceeding the voltage across said primary source for closing said first switch means.

9. The combination of claim 2 wherein each of said voltage sensing means includes a voltage divider branch;
   means applying said cell voltage across said voltage divider branch;
   a tunnel diode biased for monostable operation; and
   means coupling said tunnel diode to said voltage divider branch.

10. The combination of claim 9 including an inductor coupling said voltage divider branch to said tunnel diode.

11. The combination of claim 9 including an amplifier;
    AC coupling means coupling said tunnel diode to said amplifier; and
    delay means coupled to said amplifier for building up a DC output signal in response to an AC signal coupled thereto.

12. The combination of claim 11 including feedback means for coupling said DC output signal to said tunnel diode for increasing current therein.

13. The combination of claim 9 wherein said voltage divider branch includes a temperature sensitive device.

14. The combination of claim 9 including means connected to said voltage divider branch and responsive to charge current through said battery for diverting current from said tunnel diode.

References Cited

UNITED STATES PATENTS

| 3,278,824 | 10/1966 | Runyon | 320—18 X |
| 3,293,529 | 12/1966 | Fontaine | 320—15 |
| 3,305,754 | 2/1967 | Oaks et al. | 320—18 X |

JOHN F. COUCH, Primary Examiner

STANLEY WEINBERG, Assistant Examiner

U.S. Cl. X.R.

320—31, 40